Aug. 14, 1951  R. L. VANCE  2,564,040
GLOW DISCHARGE VOLTAGE CONTROL DEVICE
Filed July 12, 1949  2 Sheets-Sheet 1

INVENTOR
R. L. VANCE
BY
ATTORNEY

Aug. 14, 1951 R. L. VANCE 2,564,040
GLOW DISCHARGE VOLTAGE CONTROL DEVICE
Filed July 12, 1949 2 Sheets-Sheet 2
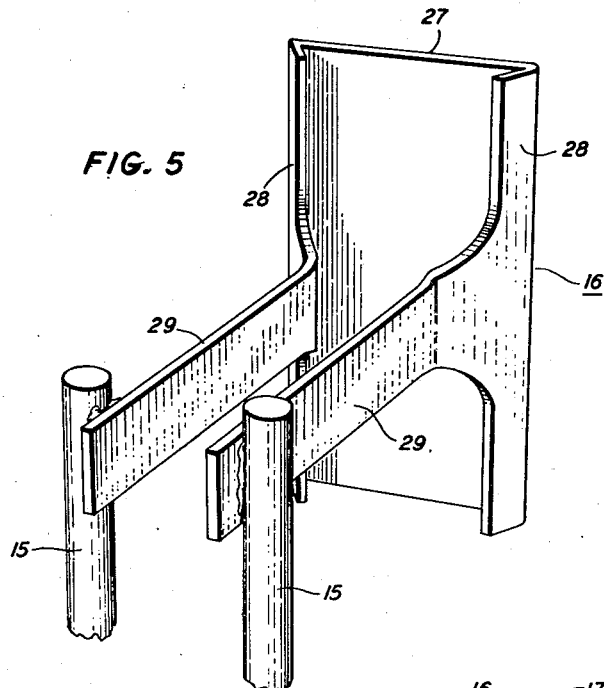
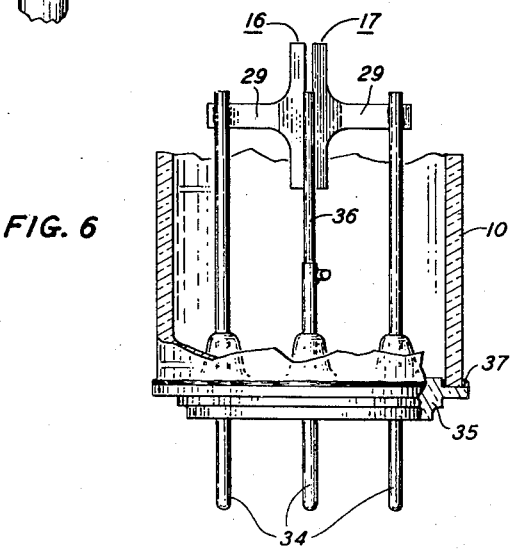
INVENTOR
R. L. VANCE
BY
ATTORNEY Patented Aug. 14, 1951

2,564,040

UNITED STATES PATENT OFFICE 2,564,040

GLOW DISCHARGE VOLTAGE CONTROL DEVICE

Robert L. Vance, Springtown, Pa., assignor to Bell Telephone Laboratories, Incorporated, New York, N. Y., a corporation of New York Application July 12, 1949, Serial No. 104,255

10 Claims. (Cl. 313—217)

This invention relates to constant glow discharge devices and more particularly to the mounting of the electrodes and the electrode structure for such devices.

In voltage reference tubes it is necessary that the voltage be very stable over a long operating life. The general problem of voltage instability in such tubes is discussed in the copending application of Mark A. Townsend, Serial No. 104,264, filed July 12, 1949. The present invention is an improvement over the devices therein disclosed.

It is particularly essential in such devices that the electrode mount and electrode structure provide constant, very accurate spacing between the electrodes. Because of the rigorous aging process to which such devices are subjected, as described in the above-mentioned application, the electrode structure and mounting must be very rugged to present distortion of the electrodes or any change in their positioned alignment. The configuration of the electrodes is important and their spacing must be maintained very accurately.

One object of this invention is to provide a glow discharge device in which the electrodes are accurately mounted.

Another object of this invention is to provide an electrode structure, that is rugged and not subject to distortion during the processing of the tube.

A further object of the invention is to provide a connection between the electrode structure and the support leads whereby bimetallic expansion of the junction does not affect the electrode spacing.

In order to substantially prevent or minimize possible variation of the electrode spacing due to thermal bimetallic action between the electrodes and the supporting mount, in accordance with one feature of this invention each electrode is formed of a thin metallic plate having sections bent back angularly to strengthen the flat surfaces and long arms in parallel relation extending rearwardly from the angular portions.

In accordance with a further feature of this invention a support wire is connected to each of these arms so that at the junction of the arms and supports the bimetallic tendency of the junction to shift on heating does not affect the interelectrode spacing.

In accordance with a still further feature of this invention a spacer block for the supports is provided and has narrow slits cut into its top face separating the areas in direct contact with the electrodes from each other to minimize the possibility of electrical leakage between the electrodes which might occur as a result of the metallic sputtering accompanying the high current aging process.

In one illustrative embodiment of this invention, two similarly shaped electrodes, which serve as anode and cathode, are spaced closely adjacent each other to form the glow discharge gap, each plate having an intermediate flat surface, integral bent back angular side portions, and long arms in parallel relation extending rearwardly from the angular portions so as to be perpendicular to the flat surface of the plate. An insulating spacer block has pairs of parallel apertures therethrough for support wires which are attached to the arms at their ends away from the electrode surface, the wires being also secured to the spacer block and to the lead-in wires. Relative motion of the electrode arms because of bimetallic action then occurs at right angles to the effective electrode gap space or parallel and across the electrode surface. The effect of this action is to twist the arms, the motion being thus taken up by the resilient bending of the arms and not affecting the gap spacing.

In another illustrative embodiment of this invention the arms are connected directly to stiff lead-in wires, the additional support of the spacer block not being employed. In either embodiment the device may be a diode or be provided with a third, starter electrode.

These above noted and other features of the invention will be more readily understood by consideration of the following detailed description and the accompanying drawings, in which:

Fig. 5 is an enlarged perspective view of an electrode illustrative of this invention; and Fig. 6 is a view, partly in cross-section, of another glow discharge device illustrative of another embodiment of this invention.

Figure 1:
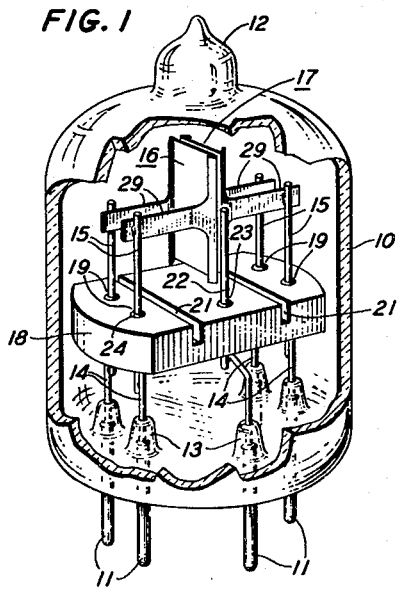
Fig. 1 is a perspective view of a glow discharge device illustrative of one embodiment of this invention, a portion of the glass envelope having been broken away to show the internal elements of the device.

Referring now to the drawing, the illustrative embodiment of the invention shown in Fig. 1 comprises an enclosing glass vessel 10 having a plurality of base pins or terminals 11 sealed in the base for mounting directly in a socket and an exhaust tubulation 12 at its top. The base pins 11 are attached in the seals 13 in the base to lead-in wires 14. Four of these lead-in wires 14 have attached to them support wires 15 which support the anode 16 and the cathode 17. A ceramic spacer block 18 is positioned in the device just above the ends of the lead-in wires 14 and has apertures 19 through which the support wires 15 extend. The support wires are mounted by the spacer block 18 as by a glaze cement 24. The block 18 has grooves 21 in its face adjacent the electrodes 16 and 17. A wire starter electrode 22 extends through an aperture 23 in the ceramic block 18 adjacent one edge of the electrode gap and is attached to one of the lead-in wires 14. The starter electrode 22 is also attached to the ceramic block as by a glaze cement 24. A spot of radium bromide 25 is deposited on the inside of the vessel to provide residual ionization.

The electrode structure, as best seen in Fig. 5, comprises an intermediate flat surface portion 27 and angularly bent back side portions 28. A long thin arm 29 is attached to each side portion to extend perpendicular to the surface 27 at about its mid-region. The electrodes are attached to the support wires 15 at the end of the arms 29. While the wires 15 are shown at right angles to the arms 29 and are also shown connected to the outside of the arms, they could be connected to the inside of the arms and not at right angles. As long as the electrodes are supported at the end of the arms which extend perpendicularly to the electrode surfaces, any relative motion introduced by thermal bimetallic action is parallel to the electrode surfaces and is taken up by the resilient bending or twisting of the arms. When electrode surfaces are directly supported by the support wires without the arms 29, the bimetallic action causes the electrode to rock back and forth in an arc around the weld joint, thereby destroying the electrode alignment and the accuracy of the gap spacing. By providing arms 29 however, to which the support wires are attached the electrode spacing can be kept within ±5 per cent of its nominal value.

It has been found advantageous that the electrodes be of molybdenum, though other metals such as tantalum could be used. It has also been found advantageous to form the wire supports 15 of a nickel, iron, and cobalt alloy, known commercially as "Kovar," because of its low thermal conduction characteristic and the similar coefficient of expansion with respect to the ceramic spacer block 18 and cement used to attach the supports in the spacer block, which may be of steatite.

In one particular embodiment of the device of Fig. 1 the electrodes are molybdenum plates, .010 inch thick spaced .020 inch apart to form the glow discharge gap, the intermediate flat surface portion 27 being three-eighths inch long and three-sixteenths inch wide. The arms 29 are one-sixteenth inch wide and one-eighth inch apart, while the angular bent side portions 28 each form an angle of 45 degrees with the surface 27.

In order to obtain the minimum fluctuation in voltage required for the operation of these devices as voltage reference tubes and thus the maximum stability of tube voltage drop the electrodes should have very clean work surfaces. Thus after degreasing the electrodes it has been found desirable to chemically treat the molybdenum in a solution, for instance, such as 4 to 1 nitric and sulphuric acids for approximately one-half minute before treating it with hydrogen at approximately 1400° C. for one-half hour. Further in order to insure restriction of the discharge only to the desired surface area, all the surfaces of the cathode except that immediately opposite the anode are calorized, as with a coating of aluminum oxide.

The tube is filled as with Argon at 30 millimeters of mercury pressure, and sealed off. It is then aged in accordance with the aging process described in the above-mentioned Townsend application, wherein the cathode is subjected to electrical bombardment whereby the top layer of the molybdenum electrode surface sputters off and is deposited on the glass wall 10 and other surfaces within the tube. This sputtering of the surface metal thoroughly cleans the electrode, cleans up deleterious gases, and provides a mechanical gettering action by forming a black coating of metal on the interior of the tube which acts as a prison for contaminants which might otherwise evolve from the glass walls of the tube and contribute to tube deterioration with life. Some of the diffused metal is also deposited on the top of the spacer block 18 but the grooves 21 formed in the top surface between the support wires prevent a continuous film which would short the device.

The tube, because of the electrode and mounting configuration, operates on the lower end of the abnormal glow discharge characteristic curve, as taught by the above-mentioned Townsend application, to provide stability of terminal voltage at relatively constant current as desired in a voltage reference tube over a long operating life of much more than a thousand hours. Such a tube has an average voltage drop variation of only .2 or .3 per cent over a period of one thousand hours.

Figure 3:
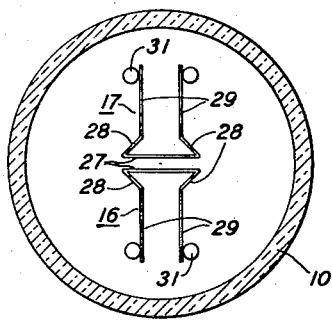
Fig. 3 is a plan view of a glow discharge device illustrative of another embodiment of this invention.
Figure 2:
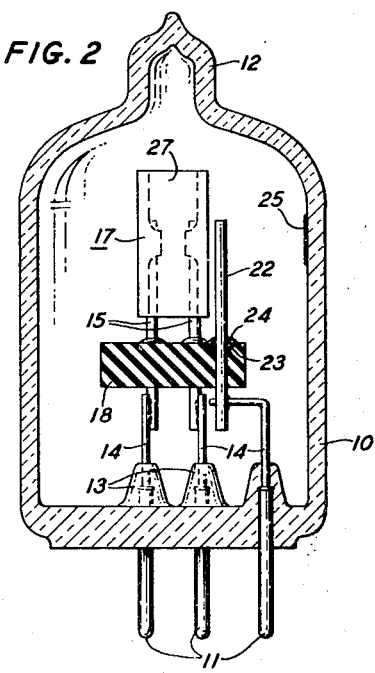
Fig. 2 is a view in cross-section of the device of Fig. 1.

Neither the starter electrode 22 nor the spacer block 18 are essential to the operation of the tube as a voltage reference device. In Fig. 3 another illustrative embodiment of this invention is shown with these two elements omitted. In this embodiment stiff leads 31 are sealed through the base of the glass envelope 10 by the seals 13. The electrodes 16 and 17 are then attached directly to two of the stiff leads each. The electrodes are attached at the end of their arms 29 as in the prior described embodiment.

Figure 4:
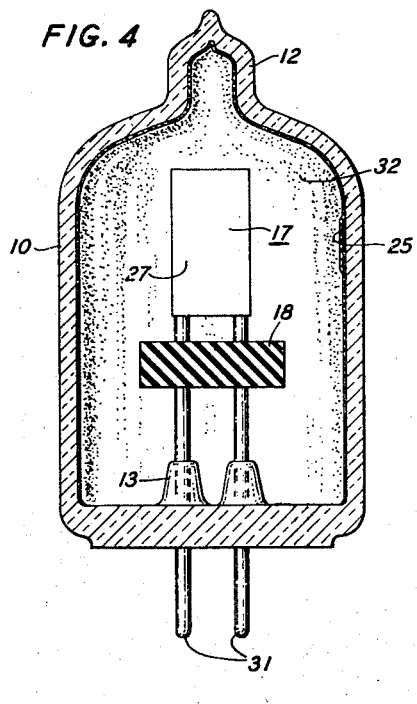
Fig. 4 is a view in cross-section of a modification of the device of Fig. 3.

In the fabrication of this embodiment it is necessary that the stiff leads 31 do not change their position during the sealing operation. If difficulty is encountered in the sealing operation the insulator block 18 may be used to insure proper spacing, as shown in Fig. 4. However, in this form the insulator is not sealed to the leads by cement but merely acts as a rigid spacer for the four electrode leads, being supoprted by one of them. In Fig. 4 the sputtered material 32 is shown on the interior of the envelope 10. While the opaque material 32 thus deposited on the glass envelope 10 covers the radium bromide spot 25, this does not affect the starting characteristic of the device as the transformation of the radon gas present provides alpha particles for residual ionization.

In Fig. 6 still another illustrative embodiment of this invention is shown wherein stiff leads 34 extend through a separate stem 35 which is sealed by a sealing cement 37 to the glass envelope 10. The electrodes are mounted directly on the stiff leads. This method of sealing the stem to the envelope insures that there is no movement of the leads during the sealing and the discharge gap is therefore held constant. A starter electrode 36 may be attached to one of the leads 34.

It is to be understood that the above-described arrangements are illustrative of the application of the principles of the invention. Numerous other arrangements may be devised by those skilled in the art without departing from the spirit and the scope of the invention.

What is claimed is:

1. A glow discharge device comprising an enclosing vessel having a gas filling therein, a pair of planar electrodes adjacent each other in said vessel, each of said electrodes comprising a plane surface, angular bent portions extending rearwardly from said plane surface and long integral arms extending approximately perpendicular to the plane of said surface and attached to said portions, and a pair of lead-in wires extending opposite the rear surface of each of said electrodes and removed therefrom, each of said arms being attached to one of said lead-in wires.

2. An electrode for a glow discharge device comprising a plane surface, angular bent portions extending rearwardly therefrom, and a pair of long integral parallel arms perpendicular to the electrode surfaces and attached to said portions for attachment to lead-in wires at a distance from said electrode.

3. A glow discharge device comprising an enclosing vessel having a gas filling therein, a pair of lead-in wires extending into said vessel, a planar electrode in said vessel at a distance from said lead-in wires, and means mounting said electrode from said pair of lead-in wires for preventing variances in the position of said electrode, said means comprising angular bent portions extending rearwardly from said electrode and long arms integral with said electrode and extending from said portions, one of said arms being attached to each of said lead-in wires, whereby bimetallic action between said lead-in wires and said arms does not affect the spacing of said electrode.

4. A glow discharge device comprising an enclosing vessel having two pairs of lead-in wires at opposite sides of said vessel, a gas filling therein, and a pair of parallel plate electrodes of equal dimensions adjacent each other approximately mid-way between said pairs of wires, each of said electrodes comprising a plane surface, angular bent portions extending rearwardly therefrom, and long integral parallel arms perpendicular to the electrode surfaces, each of said arms being attached to a corresponding one of said lead-in wires, whereby bimetallic action between said lead-in wires and said arms does not affect the spacing of said electrodes.

5. A glow discharge device in accordance with claim 4 wherein said electrodes are of molybdenum and said lead-in wires of iron-nickel-cobalt alloy.

6. A glow discharge device comprising an enclosing vessel having a plurality of lead-in wires and a gas filling therein, a pair of parallel plate electrodes having angular bent portions extending rearwardly therefrom and integral parallel arms perpendicular to the electrode surfaces, said arms being each attached to one of said lead-in wires, and an insulator spacer attached to said lead-in wires.

7. A glow discharge device comprising an enclosing vessel having a stem with a plurality of lead-in wires and a gas filling therein, an insulating spacer having apertures therein through which apertures said lead-in wires extend, and a pair of parallel plate electrodes of equal dimensions adjacent each other, each of said electrodes comprising a plane surface, angular bent portions extending rearwardly therefrom, and integral parallel arms perpendicular to said electrode surface, said parallel arms being each attached to one of said lead-in wires, and another of said lead-in wires extending through said spacer constituting a starter electrode adjacent the edges of said electrodes on one side.

8. A glow discharge device comprising an enclosing vessel having a stem and a plurality of lead-in wires and a gas filling therein, an insulating spacer block having apertures therein, said lead-in wires extending through said apertures, said block having a slot across its surface opposite said stem and between said apertures, and a pair of parallel plate electrodes of equal dimensions adjacent each other, each of said electrodes comprising a plane surface, angular bent portions extending rearwardly therefrom, and integral parallel arms attached to said portions and perpendicular to said electrode surface, each of said arms being attached to one of said lead-in wires.

9. A glow discharge device comprising an enclosing vessel having a flat stem with a plurality of lead-in wires and a gas filling therein, upright supports attached to some of said wires, an insulating spacer block having apertures therein, said supports extending through said apertures and being attached to said block, said block having a slot across its surface opposite said stem and between said apertures, a pair of parallel plate electrodes of equal dimensions adjacent each other, each of said electrodes comprising a plane surface, angular bent portions extending rearwardly therefrom, and integral parallel arms attached to said portions and perpendicular to said electrode surface, each of said arms being attached to one of said supports, and a wire starter electrode attached to another of said lead-in wires and extending through said spacer adjacent the edges of said electrodes on one side.

10. A glow discharge device comprising an enclosing vessel having a gas filling therein, lead-in wires extending into said vessel, a pair of parallel planar electrodes mounted adjacent each other in said vessel, and means for preventing variance in the spacing of said electrodes, said means comprising arms integral with said electrodes and extending rearwardly therefrom, said arms being attached to some of said lead-in wires, whereby bimetallic action between said lead-in wires and said arms does not affect the spacing of said electrodes, and said means also comprising a spacer block through which said lead-in wires extend.

ROBERT L. VANCE.

REFERENCES CITED

The following references are of record in the file of this patent:

UNITED STATES PATENTS

| Number | Name | Date |
|---|---|---|
| 2,060,825 | Ressler et al. | Nov. 17, 1936 |
| 2,415,816 | Depew et al. | Feb. 18, 1947 |
| 2,486,065 | Saucet | Oct. 25, 1949 |